United States Patent [19]

Moldenhauer

[11] Patent Number: 4,787,411
[45] Date of Patent: Nov. 29, 1988

[54] VALVE CONTROLLED BY THE SAME MEDIUM IT HANDLES AND ACTIVATED BY A PREFERABLY ELECTROMAGNETIC CONTROL VALVE

[75] Inventor: Hermann Moldenhauer, Dusseldorf, Fed. Rep. of Germany

[73] Assignee: Firma A. U. K. Muller GmbH & Co. KG, Dusseldorf, Fed. Rep. of Germany

[21] Appl. No.: 131,150

[22] Filed: Dec. 10, 1987

[30] Foreign Application Priority Data

Dec. 13, 1986 [DE] Fed. Rep. of Germany ....... 3642669

[51] Int. Cl.$^4$ .................. F15B 13/043; F16K 31/383
[52] U.S. Cl. ..................................... 137/244; 251/45; 251/38
[58] Field of Search .................. 251/33, 45, 44, 38; 137/244

[56] References Cited

FOREIGN PATENT DOCUMENTS 412491 11/1966 Switzerland ........................ 137/244
182459 11/1966 U.S.S.R. ............................. 137/244

Primary Examiner—Arnold Rosenthal
Attorney, Agent, or Firm—Sprung Horn Kramer & Woods

[57] ABSTRACT

A valve controlled by the same medium it handles and released by a preferably electromagnetically activated control valve. Contaminants in the medium that clog up the control bore in servocontrolled valves that employ a differential piston, a relief bore that can be closed off with a control valve, and a control bore that connect a pressure connection with a control space prevent the valve from closing. A mechanism that is especially simple in design is proposed to constantly keep the control bore clean during operation. The control space accommodates a wire spring that rest against the differential piston and against the valve housing and extends through the control bore. The motion of the piston is accompanied by a relative motion between the control bore and the spring that results in a constant cleaning action. The valve is especially practical in water lines and has the advantage of constant self-cleaning on the part of the control bore. When the spring is appropriately tensioned, it is impossible for the valve to open subject to reverse pressure. The spring also creates an electrically conductive metal connection through the control bore.

4 Claims, 2 Drawing Sheets

VALVE CONTROLLED BY THE SAME MEDIUM IT HANDLES AND ACTIVATED BY A PREFERABLY ELECTROMAGNETIC CONTROL VALVE

BACKGROUND OF THE INVENTION

The present invention relates to a valve controlled by the same medium it handles and released by a preferably electromagnetically activated control valve, with a differential piston that moves back and forth in a valve housing and that has a valve plate mounted on it, with a pressure space at one end that communicates with a valve intake and through a valve seat that faces the valve plate with a valve outlet, and with a control space at the other end that communicates with the valve outlet through a relief bore that is positioned at the center of the differential piston and can be closed off by the control-valve plate and with the pressure space through a control bore that is positioned eccentrically in the differential piston, and wherein a pin that is secured to the valve housing extends into the relief bore.

Servo-controlled valves of this type are known. German Pat. No. 976 465, describes making the pin that extends into the control bore in a valve of this type conical such that its flow cross-section will vary when the differential piston moves. The object is to decelerate the known valve during its final phase in order to prevent water hammering.

Furthermore, German Pat. No. 1 263 425 describes a valve that is controlled by the same medium it handles and wherein the pressure space is separated from the control space by a diaphragm with an access opening of the same cross-section as the control bore, and wherein a conical pin mounted on a moving cover component extends into the opening. This design is also intended to decelerate the closing motion and prevent water hammer. The same publication mentions that the conical pin extending into the access opening prevents it from getting clogged up with contaminants in the medium because the pin, as it moves inside the access opening executes not only an axial motion but also a radial motion and accordingly cleans out the opening.

Valves of the aforesaid type that are controlled by the same medium they handle must satisfy specific conditions with respect to the way they operate, especially when they are employed in public water-supply systems. It is for example expected that no impermissible pressure drop can be detected upstream of the valve while it is opening. A relief bore is important during the opening of a servo-controlled valve of this type. Prerequisite to the closing phase is that no extreme pressure impact exist upstream of the valve that might exert feedback on other equipment and installations.

This implies that the control and relief bores, which are so important to proper function, must be in a certain ratio to each other and must be dimensioned to comply with the applicable regulations.

It has now turned out that valves, that are regularly tested with water just after being manufactured often develop problems subsequent to long-term storage and before being used for the first time in that the cross-section of the control bore changes or gets clogged up. This can primarily be ascribed to biomass present in the residual testing water in the form of algae or slime-producing bacteria that clogs up the bore, which often is very narrow in relation to its length.

The manufacturer of valves of this type must accordingly take precautions to prevent this from happening.

Especially at risk in this context are valves wherein the differential pistons that have the control bore are made out of plastic.

SUMMARY OF THE INVENTION

With the aforesaid and in itself known concept of cleaning a control bore during operation as a point of departure, the object of the present invention is to provide a valve of the aforesaid type, wherein even bores that are extremely narrow in relation to their length can be reliably cleaned by extremely simple means. The invention is in particular directed to valves made out of plastic parts. Another object of the invention is to make it possible by extremely simple means to comply with other demands that are frequently made on this type of valve.

One demand of this type is to ensure that no water can flow backwards through the valve.

Another frequently made demand is that the medium that comes into contact, the water in other words, is included within the protective "grounding" measure in a magnetic valve constructed of plastic parts. This demand is especially difficult to satisfy in a valve of the aforesaid type because, when the valve is closed, the medium in the pressure space communicates with the medium in the control space only through the control bore, which is full of medium, and this can mean relatively high electric resistance.

The aforesaid object is attained and satisfaction of the additional demands made possible in accordance with the invention by an improvement wherein the pin is part of a spring that is shaped out of wire, that is inserted into the control space, and that is designed and positioned such that an initial straight section rests against the end of the differential piston that faces the control space, another straight section extends out of the first section and rests against the inner surface of the wall of the control space that faces the differential piston, and a third straight section extends out of the second section, through the control bore, and into the pressure chamber.

The third section of the spring, the section that extends into the pressure space, can have a hook-shaped bend at its outer end.

The three sections of the spring can be essentially straight and have curved sections between them, with the first straight section resting against the surface of the differential piston, the second straight section extending at an angle between the surface of the differential piston and the inner surface of the control space with its end resting against that surface, and the third straight section extending perpendicular to that surface and through the control bore.

In another embodiment the spring can not only be part of a helical compression spring that the differential piston rests against the valve housing on, but can also be integrated into the terminal winding of the compression spring that rests against the piston.

The basic principle of the invention is that the pin that extends into the control bore is part of a spring, one straight section of which extends through the whole bore, from the control space into the pressure space. A spring of this type is extremely easy to manufacture, and no special measures must be taken to secure, as is the case with known valves of this type, a pin to the housing or a moving part, which is extremely difficult with plastic valves in particular.

As will be discussed later herein with reference to examples of possible embodiments, the object of the invention is not only extremely simple to obtain from the aspect of design, but also results in an outstanding cleaning action because the part of the spring that extends through the control bore is always inside the bore and executes not only an axial but also a relative radial motion every time the differential piston moves.

It is also extremely simple with the spring in accordance with the invention to simultaneously satisfy the other aforesaid demand that the valve will not open when it is subjected to reverse pressure. It is necessary only to design and dimension the spring, which rests of course against both the differential piston and in the inner surface of the wall of the control room, such as to exert additional force on the piston. This reverse seal can be established for example for a pressure of 0.2 to 0.5 bars.

Finally, the design in accordance with the invention also makes it possible to satisfy the further demand that the medium be included in the protective grounding. The section of the metal spring that extends all the way through the control bore metallically connects the medium in the control space with the medium in the pressure space. When, accordingly, the electromagnetically activated control valve, wherein the plate is mounted on an armature that more or less extends into the control space, and hence the top of the valve, is electrically connected to to the ground lead, the medium in the control space will be included in this protective measure and the protective measure will be applied through the section of the spring that extends through the control bore to the medium in the pressure space.

Some preferred embodiments of the invention will now be specified with reference to the attached drawings, wherein

DETAILED DESCRIPTION OF THE PREFERRED EMBODIMENTS

Figure 1:
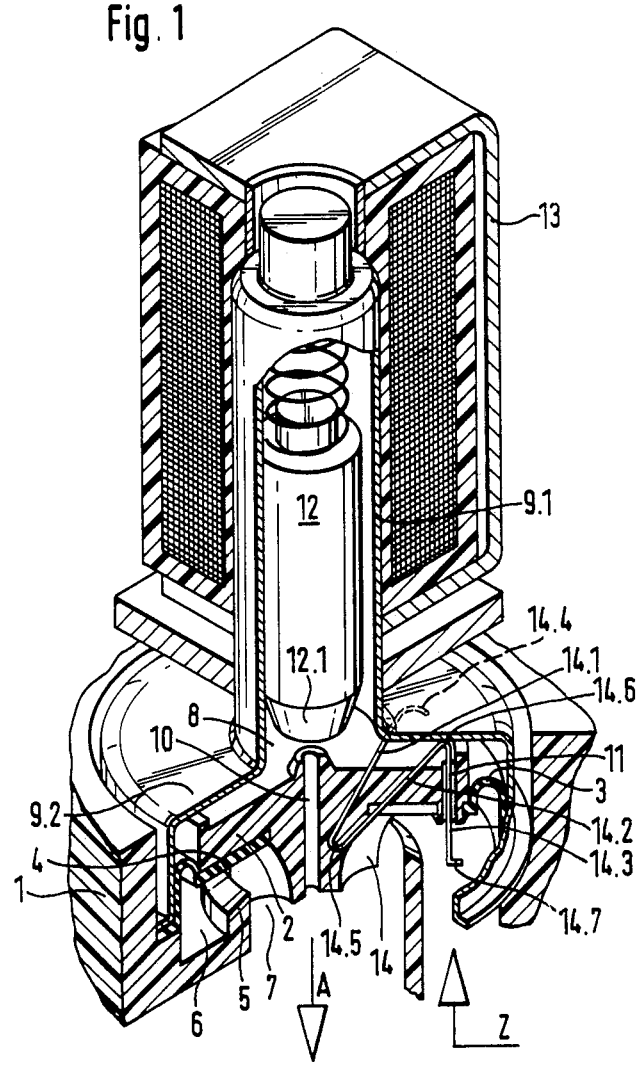
FIG. 1 is a perspective, partly sectional view of part of one embodiment of a valve according to the present invention that is controlled by the medium that it handles and that has an electromagnetically activated control valve

Referring now to FIG. 1, a schematically represented valve housing 1 accommodates a differential piston 2 that slides back and forth within it and is connected to it at the edge by a rolled diaphragm 3. Mounted on the bottom of differential piston 2 is a valve plate 4 that faces a valve seat 5. The valve intake Z, the pressure connection in other words, opens into an annular pressure chamber 6 that communicates through valve seat 5 with an outflow chamber 7 that leads to a valve outlet A.

Above the differential piston 2 in FIG. 1 is a control space 8 that is demarcated at the bottom by the surface of differential piston 2 and by rolled diaphragm 3, whereas its other demarcations are constituted by the inner surface of a positioning tube that has a wide bottom 9.2 and a narrow top 9.1, which accommodates the magnetic armature 12 of an electromagnetically activated control valve with activating components 13.

Differential piston 2 accommodates a central axial relief bore 10 that connects control space 8 to outflow chamber 7. The piston also has an eccentric axial control bore 11 that connects control space 8 to pressure space 6. The control-valve plate 12.1 at the bottom of magnetic armature 12 faces the top of relief bore 10 and blocks it off when the control valve is at rest.

The valve functions in a way that is in itself known and will now be described.

The pressurized medium flowing through valve intake Z arrives in control space 8 through pressure space 6 and control bore 11. The ratios between the surfaces of differential piston 2 ensure that, when relief bore 10 is closed off by the control valve, the differential piston will move down subject to the pressure of the medium in control space 8, and the valve will close as valve plate 4 comes to rest against valve seat 5.

If the control valve is excited and magnetic armature 12 opens relief bore 10, the pressures in control space 8 and outflow chamber 7 will become equal, and differential piston 2 will lift subject to the pressure in pressure space 6, opening the valve.

It will be obvious that, when control bore 11 clogs up, a situation will occur in which the valve can no longer close because adequate pressure cannot build up in control space 8. This can lead in the case of valves installed in automatic washers to extremely undesirable consequences accompanied by uncontrolled water escape.

The simple mechanism that will now be described is accordingly provided in order to constantly prevent control bore 11 from clogging up due for example to deposits.

Control space 8 accommodates a spring 14 made out of round spring wire. It consists of an initial straight section 14.1 that rests against the top of differential piston 2, with a bend 14.4 at its free end resting at the edge of the piston. Another bend 14.5 at its other end also rests against the edge of the piston, and that end merges into another straight section 14.2 that slants up and rests against the inside surface of the wide bottom 9.2 of the positioning tube that faces the piston. At this point there is another bend 14.6 down toward differential piston 2 that merges into a third straight section 14.3 that extends through control bore 11 and into pressure space 6. At the free end of third straight section 14.3 is a hook-shaped, right-angled bend 14.7 that prevents the spring from getting lost.

How spring 14 works will be immediately obvious. When differential piston 2 moves up and down, bend 14.6, which rests against it, will produce a relative motion between third straight section 14.3 and the inner surface of the wall of control bore 11. Since section 14.3 extends all the way through control bore 11, its cross-section will be annular.

Since the first straight section 14.1 of spring 14 rests against differential piston 2, there will be, in addition to the relative axial motion between third straight section 14.3 and control bore 11, a tipping motion on the part of the spring, leading to a more or less radial motion on the part of third straight section 14.3 within a perpendicular plane through control bore 11. The annular gap in control bore 11 will accordingly be constantly kept free of foreign material and adhering deposits.

It will also be evident that the spring 14 between the differential piston 2 and the stationary valve housing 1 in this embodiment will counteract the opening motion of the piston, so that, if the dimensions are correct, the valve will not open subject to inverse pressure. Finally, it will also be evident that the metal spring 14 will electrically connect the medium in control space 8 to the medium in pressure space 6.

Figure 2:
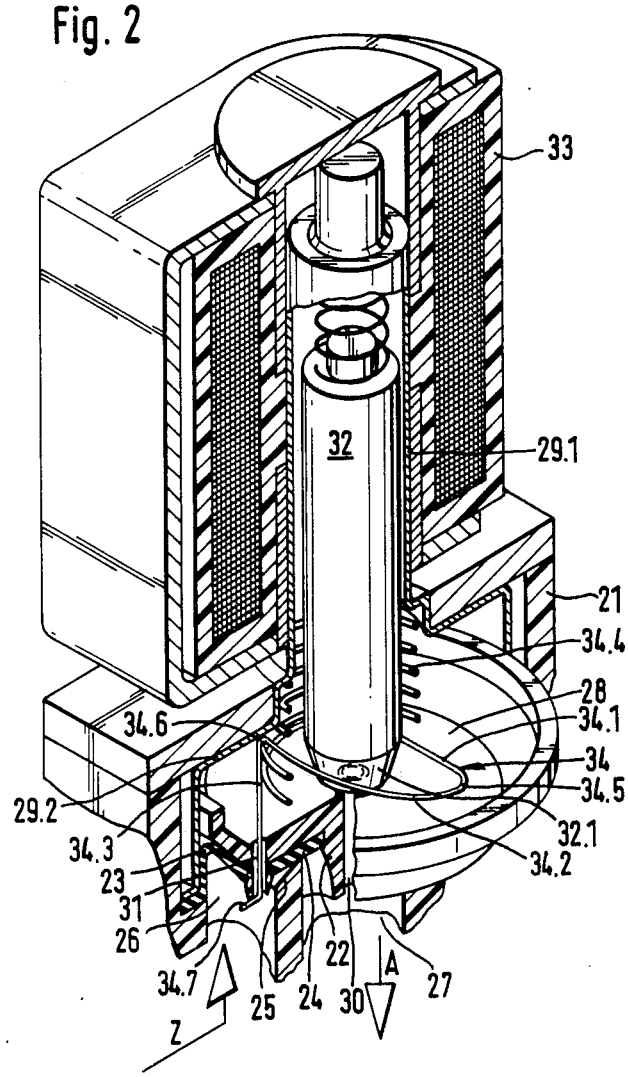
FIG. 2 is a view similar to that in FIG. 1 of another embodiment of a valve according to the present invention that is controlled by the medium that it handles and that has an electromagnetically activated control valve.

The embodiment of a valve controlled by the same medium it handles, released by an electromagnetically activated control valve, and illustrated in FIG. 2 differs primarily from the embodiment illustrated in FIG. 1 in the design of the spring.

This valve also has a housing 21 with the magnetic component 33 of the control valve mounted on it. A magnetic armature 32 is accommodated in the top 29.1 of a positioning tube and extends down into a pressure space 28 with a control-valve plate 32.1 mounted on the bottom opposite a relief bore 30 in a differential piston 22. Below differential piston 22 is an annular pressure space 26 that communicates directly with a valve intake Z and can be connected through a valve seat 25, which faces a valve plate 24 on the bottom of the piston, with an outflow space 27. Outflow space 27 communicates with a valve outlet A.

Eccentrically positioned in differential piston 22 is a control bore 31 that connects pressure space 28 to pressure space 26. Differential piston 2 is secured to the valve housing through a rolled diaphragm 23.

The spring 34 in this embodiment is in one piece with a helical compression spring 34.4 that surrounds armature 32 and rests against a setback on top 29.1 with its bottom terminal winding resting against differential piston 22. This terminal winding merges into an initial straight section 34.1 of spring 34 that continues through a curved section 34.5 into another vertical straight section 34.2. Section 34.2 has a curved end 24.6 that rests against the inner surface of the wall of the wider portion 29.2 of positioning tube, bends up at that point, and with a third straight section 34.3 extends through control bore 31 into pressure space 26, where there is a hook-shaped bend 34.7.

Spring 34 operates in principle like the spring 14 in the embodiment illustrated in FIG. 1.

Combining the spring 34 with the helical compression spring 34.4 in the embodiment illustrated in FIG. 2 results in an overall structure that not only satisfactorily braces the differential piston against resilient force at the housing to prevent opening subject to inverse pressure but also constantly cleans control bore 31 very effectively. The electric connection between the medium in pressure space 28 and the medium in pressure space 26 is ensure in the same way as in the embodiment illustrated in FIG. 1.

It will be appreciated that the instant specification and claims are set forth by way of illustration and not limitation, and that various modifications and changes may be made without departing from the spirit and scope of the present invention.

What is claimed is:

1. In a valve controllable by the medium it handles and having a valve housing, a differential piston mounted for axial movement in the valve housing a valve plate mounted on one face of the piston, a valve seat for the valve plate, means forming a pressure chamber that communicates with a valve intake between the valve seat and the valve plate, means forming a control space at the other face of the piston and that communicates with the valve outlet through a relief bore that is positioned at the axis of the differential piston, an electromagnetic control valve having a control valve plate for closing off and opening the relief bore, means forming a control bore positioned eccentrically in the differential piston and connecting the control space with the pressure member, the improvement comprising: a spring shaped from wire and inserted into the control space with an initial straight section resting against said other face of the differential piston, another straight section that extends out of the first section and rests against the inner surface of a wall of the control space that faces the differential piston, and a third straight section that extends out of the second section, through the control bore, and into the pressure chamber.

2. The valve as in claim 1, wherein the third section of the spring, the section that has a hook-shaped bend at its outer end in the pressure chamber.

3. The valve as in claim 1, wherein three sections of the spring are essentially straight and have curved sections between them, with the first straight section resting against the surface of the differential piston, the second straight section extending at an angle between the surface of the differential piston and the inner surface of the control space with its end resting against that surface, and the third straight section extending perpendicular to that surface and through the control bore.

4. The valve as in claim 1, further comprising a helical compression spring between the valve housing and said other face of the piston and wherein the wire spring is part of the helical compression spring and is also integrated into a terminal winding of the compression spring that rests against the piston.

* * * * *